United States Patent
Chalmers et al.

[11] Patent Number: 6,052,364
[45] Date of Patent: Apr. 18, 2000

[54] CDMA SYSTEM ARCHITECTURE FOR SATCOM TERMINALS

[75] Inventors: Harvey Chalmers, Rockville; Ajit Shenoy, Germantown, both of Md.

[73] Assignee: Comsat Corporation, Bethesda, Md.

[21] Appl. No.: 08/874,726

[22] Filed: Jun. 13, 1997

[51] Int. Cl.[7] .................................................. H04B 7/212
[52] U.S. Cl. ........................ 370/312; 370/314; 370/316; 370/320; 370/325
[58] Field of Search .................................. 370/312, 316, 370/314, 320, 325

[56] References Cited

U.S. PATENT DOCUMENTS

| | | |
|---|---|---|
| Re. 32,905 | 4/1989 | Baran . |
| 4,905,221 | 2/1990 | Ichiyoshi . |
| 5,084,900 | 1/1992 | Taylor . |
| 5,138,631 | 8/1992 | Taylor .......................................... 375/1 |
| 5,408,237 | 4/1995 | Patterson et al. ........................ 342/354 |
| 5,533,023 | 7/1996 | Ohlson et al. . |
| 5,539,730 | 7/1996 | Dent . |
| 5,566,164 | 10/1996 | Ohlson . |

*Primary Examiner*—Hassan Kizou
*Assistant Examiner*—Mitchell Slavitt
*Attorney, Agent, or Firm*—Sughrue, Mion, Zinn, Macpeak & Seas, PLLC

[57] ABSTRACT

A satellite communication system including a portable satellite terminal is provided which utilizes $C/K_u$-band and spread spectrum technology to drastically reduce the antenna and terminal sizes. Both CDMA and time division multiplexing (TDM) are used to permit efficient all-digital voice, facsimile and data operations in either full mesh or star modes. A single Network Controller can handle both Star and Mesh mode traffic on the same or several transponders. Narrowband CDMA/frequency division multiple access is used for inbound transmission from the terminal while outbound transmissions from the hub utilize TDM/FDMA. Furthermore, the system is scalable in fixed bandwidth increments to support network size evolution. All signalling for call setup and takedown is done in-band on the same carrier that is used for the traffic, thereby eliminating the need for a separate signalling channel and frequency retuning. Only a small set of distinct PN code sequences, independent of the actual number of user terminals in the network, are required for the entire network.

20 Claims, 8 Drawing Sheets

CDMA SYSTEM ARCHITECTURE FOR SATCOM TERMINALS

FIELD OF THE INVENTION

The present invention relates to satellite communication systems employing personal portable or maritime mobile satellite terminals. More particularly, the present invention relates to the system design of a spread spectrum terminal that employs code division multiple access (CDMA) star and/or mesh network topologies for personal portable or maritime mobile satcom services for voice, data and facsimile.

BACKGROUND OF THE INVENTION

Most conventional commercial telephony terminals for portable satcom users are those designed for operation in the Inmarsat system. This an L-band service with very large intersatellite spacing ($\geq 30°$), which easily allows small aperture L-band antennas with 3-Db beamwidths of $\pm 6°$ to be used without excessive interference to the adjacent L-band satellites.

This degree of portability has not been available for other frequency bands, such as C- and $K_u$-band terminals. This is because for C- and $K_u$-band applications, the intersatellite spacing is generally 3° and sometimes even 2°. To achieve the very narrow beamwidths required (<<0.5°) for acceptable levels of adjacent satellite interference, VSAT's (very small aperture terminal) need to employ large antenna sizes since the beamwidth is inversely proportional to the dish size. Accordingly, to comply with ITU-R Recommendation 524-3 off-axis radiation emission requirements, VSAT vendors use antenna sizes beginning at 1.8 m for C-band and 1.2 m for $K_u$-band. For mesh networks where one VSAT directly communicates with another VSAT, the antenna sizes are even larger (e.g., starting at 3.6 m at C-band). Such large sizes increase the terminal cost, severely limit transportability and necessitate elaborate mounting structures for the large dishes.

Portability requires small dish sizes. However, small dish sizes have large beamwidths. For example, a 30-cm $K_u$-band antenna has a 3-dB beamwidth of $\pm 2°$. Significant interference to and from adjacent satellites, that are spaced 2° to 3° apart, will occur which will violate ITU-R and U.S. FCC limits on off-axis energy density. For example, at 2° off axis from boresight, ITU 524-3 specifies a $K_u$-band EIRP density limit of 31.5 dBW/40 kHz. This problem can be solved by using spread spectrum technology, which spreads the transmitted energy over a sufficiently wide band to permit the use of small C- and $K_u$-band antennas while remaining within the ITU-R off-axis EIRP energy density limits, thus causing no perceptible interference to signals on the adjacent satellites.

For truly portable, rather than merely transportable or luggable, satellite terminals, only diameters of less than 1.5 meters are considered. Traditional single channel per carrier (SCPC) access methods with 0.5 m and less antennas will not allow even one carrier to be supported in the network due to the inbound off-axis interference resulting from the high carrier power concentrated in the narrow band, and the sidelobe gain of the small dish. For a typical INTELSET IV band space segment and a 11 meter diameter hub, SCPC methods require at least a 1.0 m dish in order to support 50 carriers per 18 MHz transponder, while the use of TDM/CDMA allows at least 100 carriers to be supported with 0.5 m dishes. In both cases capacity is constrained due to the satellite transponder downlink power limitations.

The use of spread spectrum and CDMA for small terminals is not new. However, the overall architecture and the reasons for implementing the system structure vary from system to system. One conventional method for performing satellite communications with small dishes deploys star and double-hop mesh small VSATs for packetized data broadcast applications using spread spectrum.

Other methods for telecommunications using spread spectrum and/or CDMA are not relevant to satellite communications because many of these are intended for terrestrial wireless cellular services. For those systems that use spread spectrum for a future LEO satellites, the spread spectrum aspect is used to ameliorate the effects of the fast Doppler frequency variations and frequency selective channel fading on the LEO satellite link. Moreover, conventional small VSAT implementations use dish antennas which are bulky due to their curvature and need a separate feedhorn and feed assembly, as well as an antenna mounting structure.

Conventional star network VSAT systems which employ spread spectrum are intended for one-way data broadcast applications only using a packet-oriented transmissions scheme. Two-way data communications are less frequently used, but still employ a centralized hub earth station as the data center with no specific ability to interconnect the calls to a public switched telephone network (PSTN). In other words, these networks were for business uses, such as credit card approval, inventory monitoring, factory ordering, bank account reconciliation, etc., not for use as a remote extension of the telephone network.

Two-way voice communications in a traditional data packet-oriented VSAT network is cumbersome to implement and manufacturers need to dedicate a separate network mode for voice. Networks offering dedicated voice channels are much more expensive than data-only systems.

Conventional mesh network VSAT systems use CDMA for multiple access to the same frequency band. To allow a large number of users, such systems use wideband CDMA, requiring many MHz of contiguous transponder bandwidth. Either a large PN code set (1000's) or a very long ($2^{31}-1$) PN code is needed, segments of which are used for individual terminals. Since the mesh operation requires direct remote-to-remote operation, the dish sizes are very large, $\geq 3.6$ m at C-band and $\geq 1.8$ m at $K_u$-band.

Network controllers typically operate in a star or mesh mode. A hybrid network controller, that can dynamically configure the frequency plan for a combined star/mesh mode operation, and support both star (from remote to PSTN) and single-hop mesh (remote to remote) terminals has hitherto been unknown. Most VSAT networks have dedicated hubs with vendor-specific RF front-ends.

Accordingly, it is an object of the invention to provide a portable satellite terminal with significantly reduced antenna and terminal size compared to conventional flyaway $K_u$/C-band satellite terminals, as well as a versatile and flexible hub, accommodating a variety of system architectures.

SUMMARY OF THE INVENTION

In accordance with the present invention, a portable satellite terminal is provided which utilizes C/$K_u$-band and spread spectrum technology to drastically reduce the antenna and terminal sizes. The briefcase size terminal utilizes either a 0.3 m-square flat plate or 0.36 m $K_u$-band dish. Both CDMA and time division multiplexing (TDM) are used to permit efficient all-digital voice, facsimile and data operations in either full mesh or star modes. A single Network Controller can handle both Star and Mesh mode traffic on the same or several transponders. In a star configuration, a dedicated hub station provides interfaces to the PSTN. In a full mesh single-hop configuration, each terminal can communicate directly with another terminal in the network, under hub control. Narrowband CDMA/ frequency division multiple access is used for inbound transmission from the terminal while outbound transmissions from the hub utilize TDM/FDMA.

The system design is flexible so that any space segment, either international, via INTELSAT satellites, or domestic, via regional satellites, may be utilized. Networks can use small sections of left-over bandwidth on multiple transponders on the same satellite so that full transponders need not be leased. This feature allows the network to be "shoehorned" into a region where full transponders may not be presently available but where unused pieces of several transponders are usually available. Furthermore, the system is scalable in fixed bandwidth increments to support network size evolution.

All signalling for call setup and takedown is done in-band on the same carrier that is used for the traffic, thereby eliminating the need for a separate signalling channel and frequency retuning. Only a small set of distinct PN code sequences, independent of the actual number of user terminals in the network, are required for the entire network. The remote terminals transmit and receive using PN sequences that are selected from a pool of available PN sequences that are made known over the Master TDM carrier. The PN codes are re-used in each of the assigned frequency sub-bands. Each hub channel unit receives inbound signals using predetermined PN sequences that do not change from one call to the next. Thus, using dynamic assignment of frequency sub-bands and availability of PN codes (as announced over the outbound TDM broadcast channel), the network can configure automatically to avoid down-time due to re-assignment of transponder space or if terrestrial interference is occurring on one or more subband frequencies.

BRIEF DESCRIPTION OF THE DRAWINGS

These and other features, aspects and advantages of the present invention will become better understood with reference to the following detailed description, appended claims, and accompanying drawings, wherein:

DETAILED DESCRIPTION OF THE INVENTION

Figure 1:
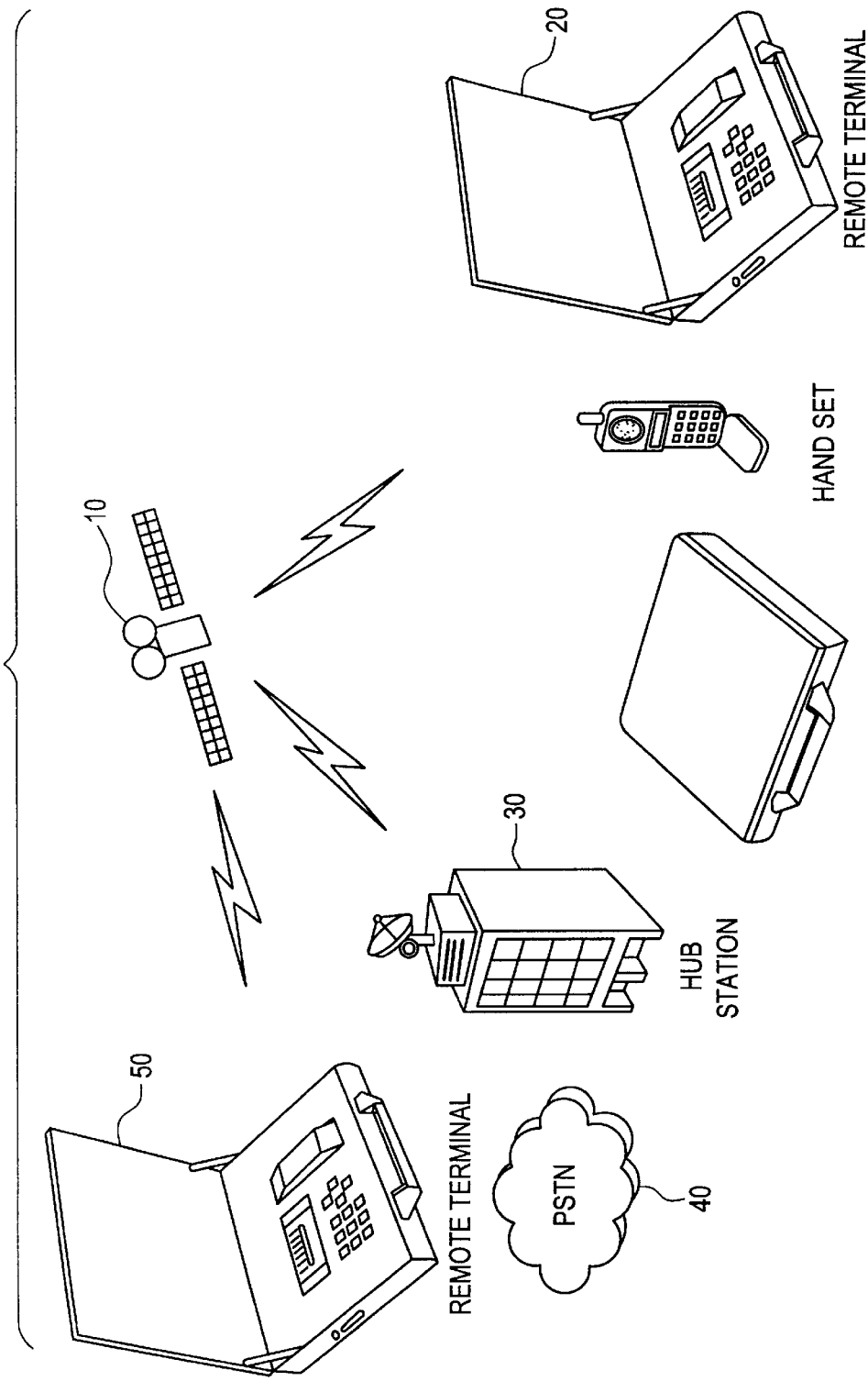
FIG. 1 shows a satellite communication network embodying the invention.
Figure 2:
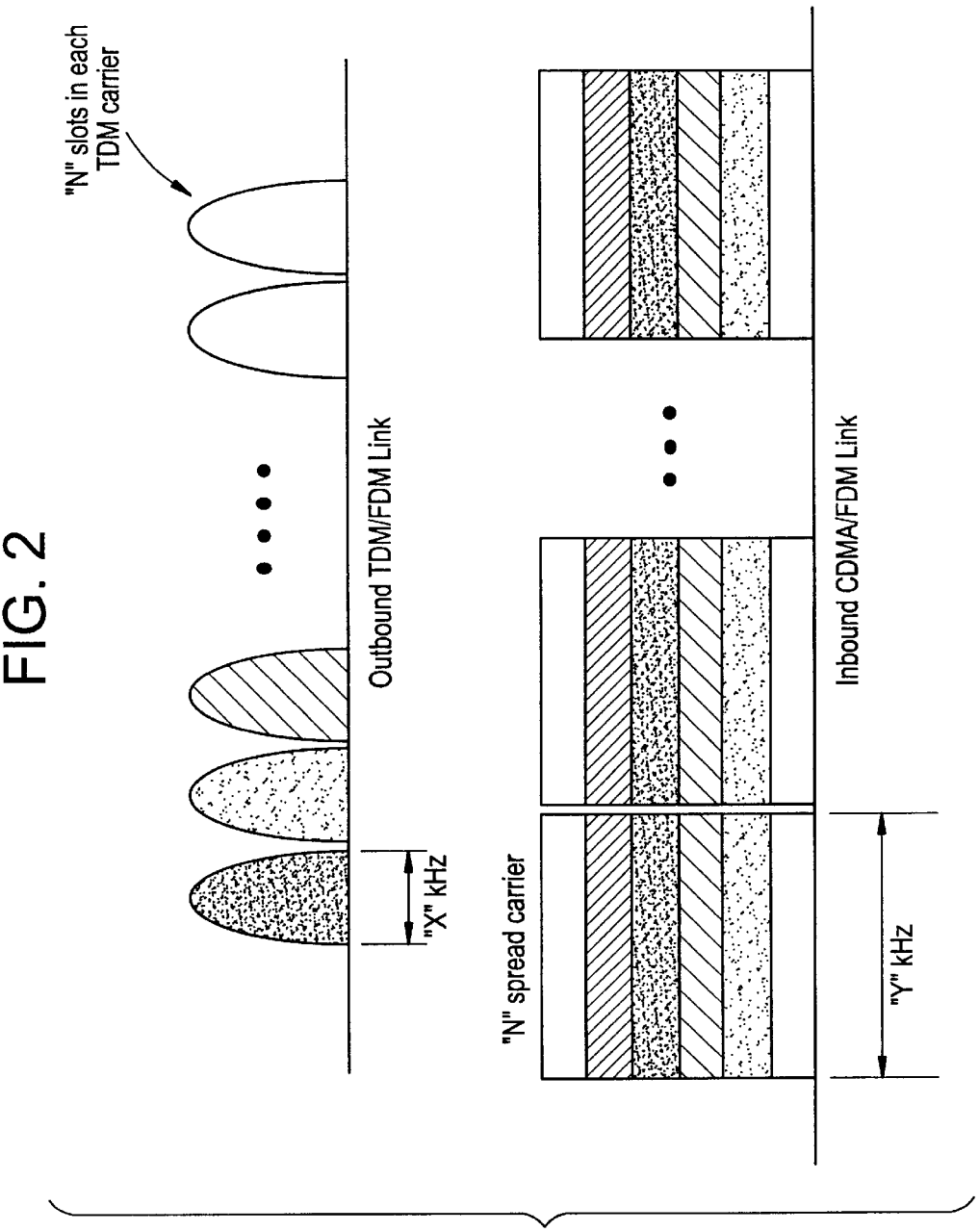
FIG. 2 shows the outbound and inbound link structure of the preferred embodiment of the present invention.

The present invention is a satellite communications system including a spread spectrum terminal that employs CDMA star and/or mesh topologies. Referring to FIG. 2, a remote terminal 20 communicates with a dedicated $K_u$/C-band hub station 30 through a space satellite 10 in a star configuration. Hub station 30 interfaces to the private switched telephone network (PSTN) 40, thereby establishing a communication link between the remote portable terminal 20 and the PSTN 40. For terminal-to-terminal or mesh mode operation, hub station 30 is involved only in the initial signalling between the calling terminal and the called terminal. Therefore, a link may be established between remote terminal 20 and remote terminal 50 in a single hop, two-step fashion through hub station 30 to enable each terminal to directly communicate with another terminal in the network in a mesh configuration once signalling with the hub is completed. In both cases, hub station 30 serves as the central point for call establishment, takedown, and the archiving of call statistics for billing.

The system is full-duplex with simultaneous transmit and receive functions. Referring to FIG. 2, narrowband CDMA/FDM (e.g., 1-MHz) is used for inbound transmission from the remote terminals to the hub. Outbound transmission from the hub to the remote terminals is TDM/FDM. CDMA is unnecessary for transmission from the hub, in both star configuration traffic channels and the star/mesh Master TDM channels, due to the existence of a large-aperture antenna that provides emissions below the off-axis limits.

The system is scalable in fixed bandwidth steps of "W" kHz, in our example embodiment W=1000, to support network size evolution and protect the network operator's investment in equipment. Each fixed bandwidth increment is split as "X" kHz in the outbound direction and "Y" kHz in the inbound direction, where X+Y=W. The outbound signal from the hub uses a TDM carrier with N timeslots per frame, where N is the number of CDMA user calls accommodated per Y kHz. There is a 1:1 correspondence between the timeslots in the forward TDM frame and the PN code used on the return link. That is, timeslot 0 on the TDM outbound link will correspond to $PN_0$ on the CDMA inbound link and, similarly, timeslot 1 corresponds to $PN_1$. The only exception is for the Master TDM carrier, where timeslot 0 is the bulletin board and $PN_0$ is reserved for future special mode inbound signalling.

For example, as shown in FIG. 2, X=200, Y=800, and N=6. The inbound CDMA signals from the remote terminals use the 800 kHz bandwidth. A 1 MHz transponder bandwidth thus supports six full-duplex 4.8 kbit/s calls. Every additional set of six simultaneous calls uses an additional 1 MHz of bandwidth. Thus, the system can start with as little as 1 Mhz of transponder bandwidth and then add capacity in increments of 1 MHz as needed. Each hub channel unit card will contain six CDMA channels. Accordingly, for every increment of 1 MHz, the service provider will an additional channel unit card.

Figure 3:
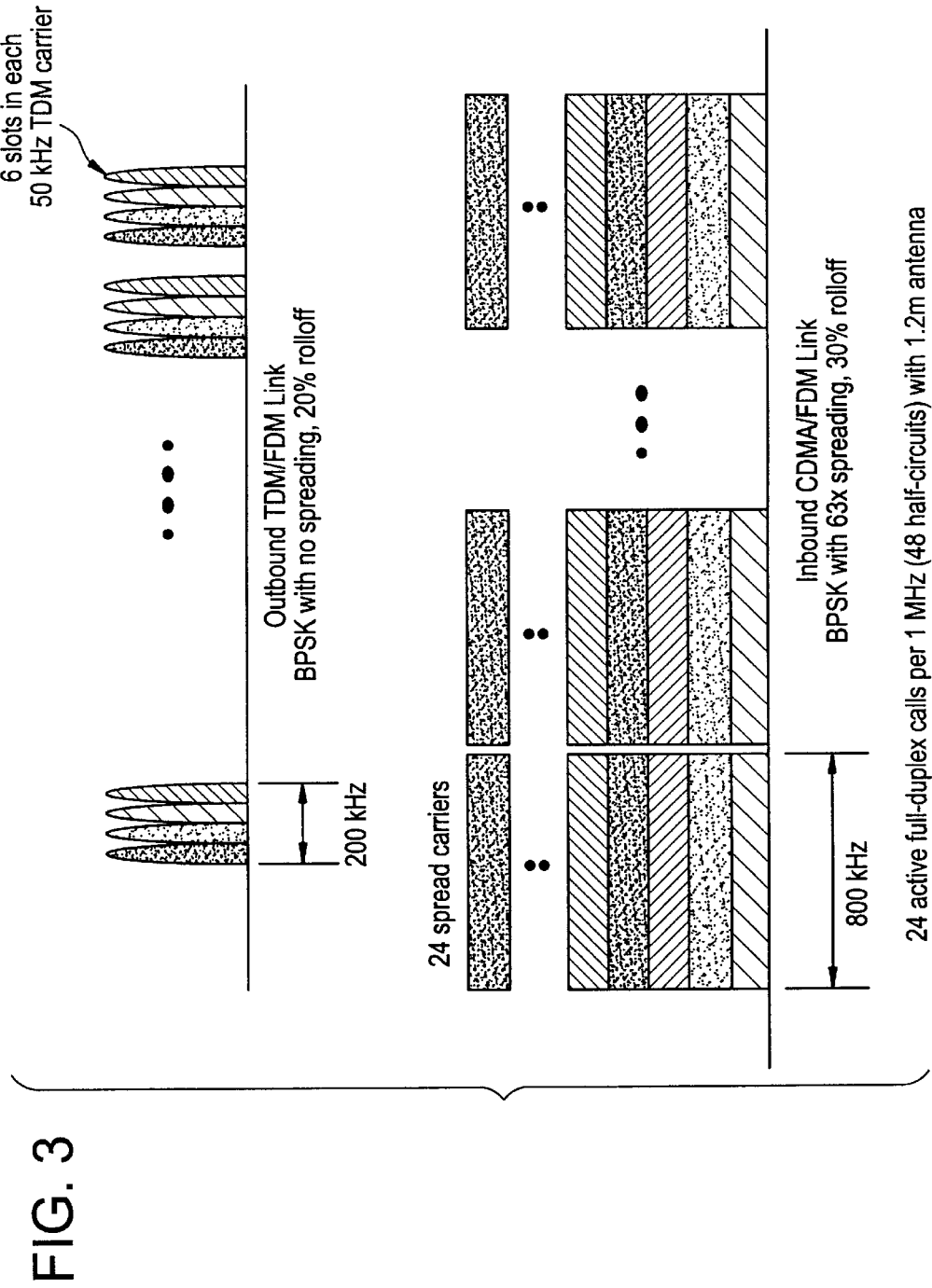
FIG. 3 shows the frequency plan of 24 star mode CDMA-calls/MHz.

To accommodate more users per MHz of bandwidth, a revised Frequency plan can be adopted such as shown in FIG. 3. Under this plan, there will be four TDM signals in the forward direction, each capable of handling 6 forward calls. Each TDM carrier will be scaled down from 200 kHz to 50 kHz by appropriate changes to the transmission format. On the return link, the carriers will still occupy 800 kHz except that 24 calls can be stacked on the same bandwidth. Accordingly, 24 full-duplex star mode calls can be carried per 1 MHz. Of course, the exact number calls per fixed bandwidth step of W depends on the space segment utilized.

Thus, with the TDM/CDMA/FDM transmission scheme, between 6 and 24 full-duplex calls can be supported per megahertz, depending on the satellite type, terminal EIRP, and level of acceptable self-interference. Frequency planning is straightforward, since capacity can be allocated in (not necessarily contiguous) 1 MHz segments. A low-bandwidth outbound signal was deliberately chosen to permit the use of very low-cost GSM cellular telephone handset analog front-end chips and filters in the terminal receiver, as well as to ease frequency coordination of the higher powered outbound carrier.

Figure 4:
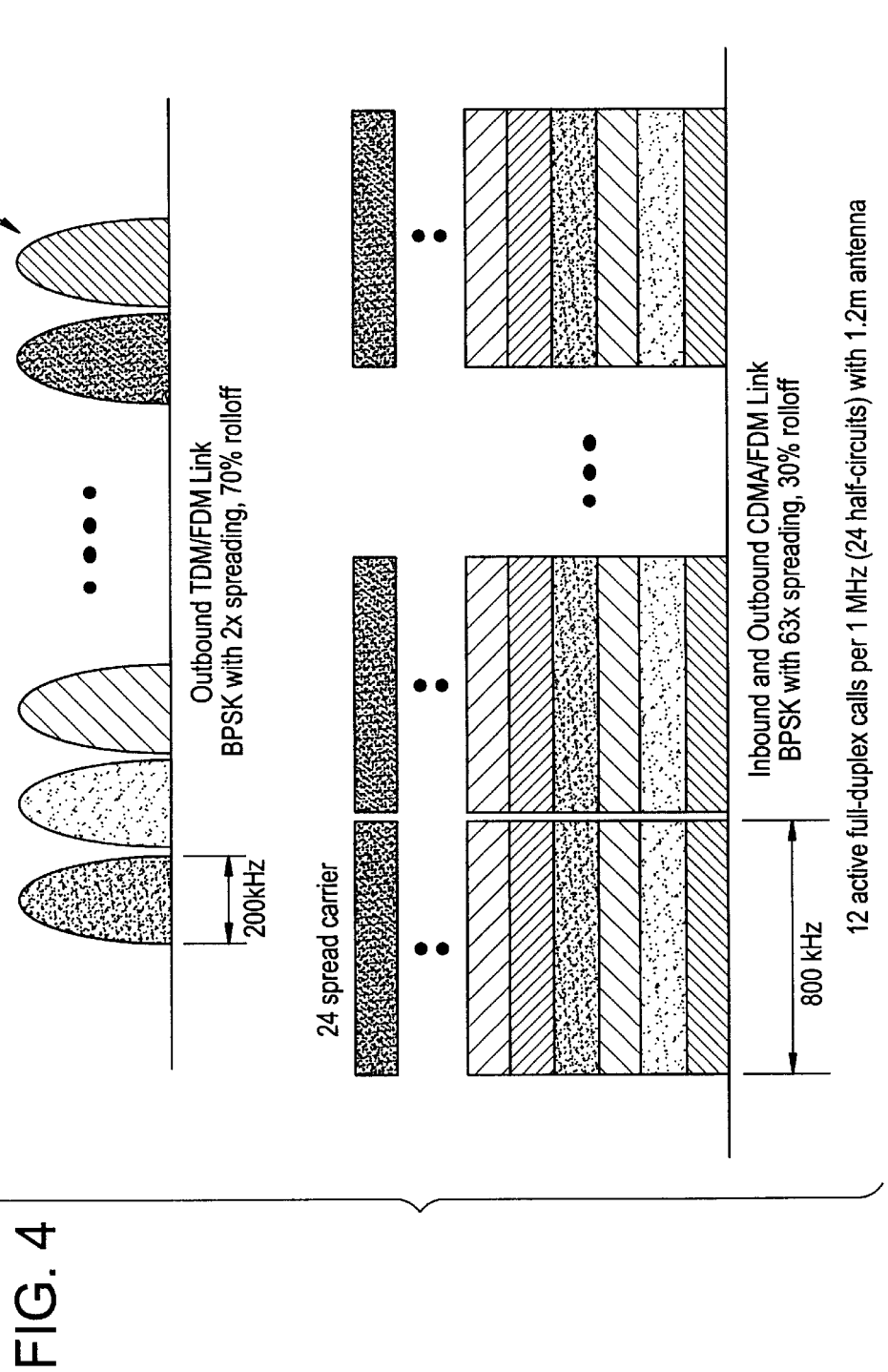
FIG. 4 shows the mesh mode frequency plan of the present invention.
Figure 5:
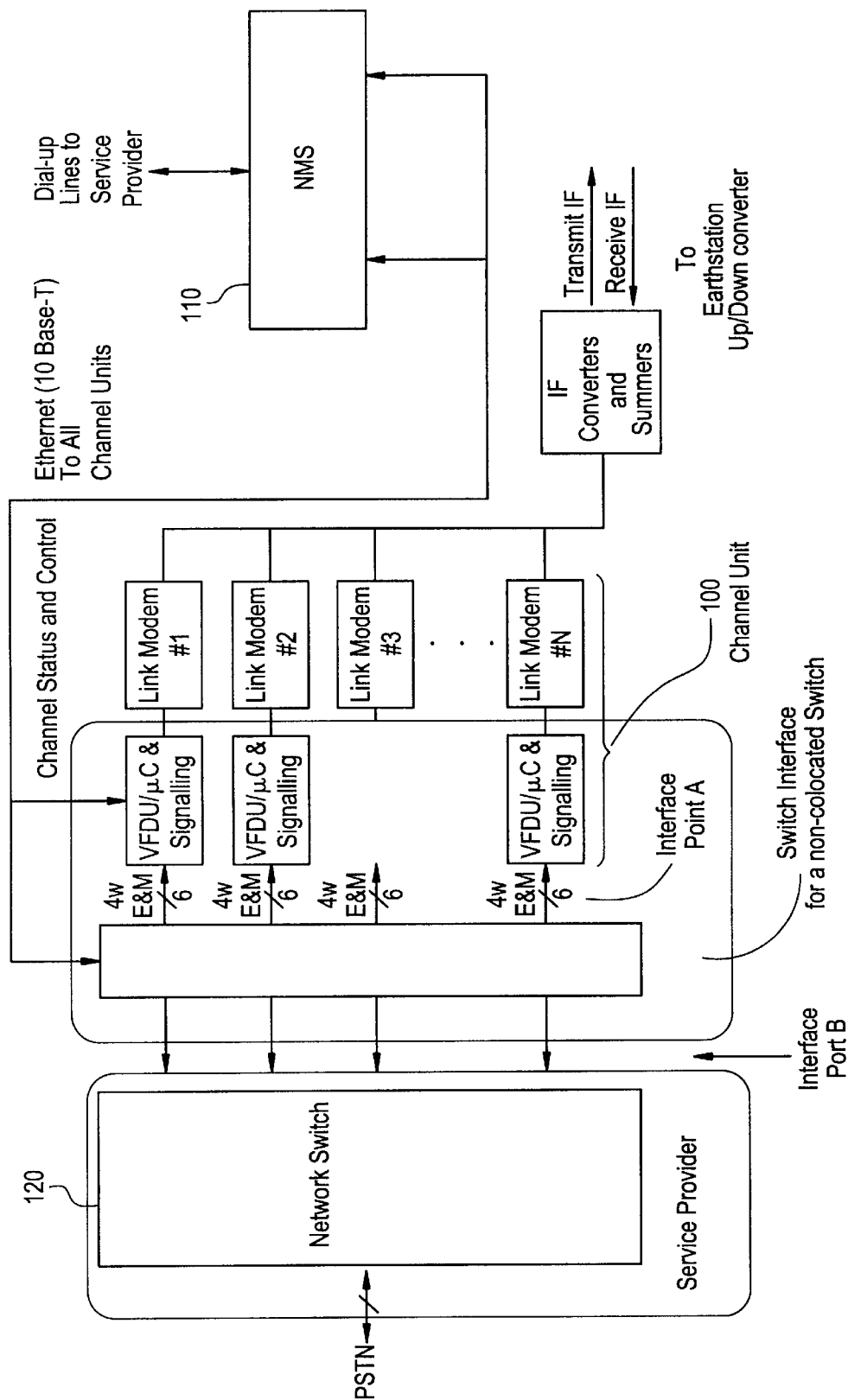
FIG. 5 shows a block diagram of the CDMA network hub.

Referring to FIG. 4, the mesh mode architecture will use the standard TDM outbound and CDMA inbound scheme to conduct signalling operations with hub initially, where it indicates that a mesh mode call is desired. Moreover, star and mesh modes are completely interchangeable because they do not require any changes in the transponder lease bandwidths. The hub utilizes the TDM outbound to indicate to the called terminal to announce a mesh mode call. The calling terminal can then communicate with the called terminal directly in mesh mode using the transmission scheme as shown in FIG. 5. A mesh mode TDM signalling carrier may also be separately dedicated for this service. For the mesh mode, the example 1 MHz bandwidth can support half as many full-duplex mesh mode calls as in the star mode (e.g., 12 instead of 24), since both the inbound and outbound are spread over the same bandwidth.

The hub channel units will receive inbound signals using fixed PN sequences that do not change from one call to the next. That is, each channel unit at the hub has its own predetermined set of PN sequences. The PN sequences assigned to the despreaders per channel unit are the same for all channel units. Their differentiation is inherent in that the return links are frequency division multiplexed. Therefore, each channel unit is tuned to a different W section of the transponder bandwidth. For example, for 24 users/MHz, four channel units are tuned to the same 1 MHz slice of the transponder bandwidth.

The remote terminals, however, transmit and receive using PN sequences that are selected from the pool of available PN sequences that are made known over the Timeslot 0 (bulletin board) of the Master TDM carrier.

The basic approach to carrier assignment is that the hub controller keeps track of system activity and places the list of available PN codes and available TDM carrier frequencies in its signaling frame on the bulletin board for the Master TDM carrier. The PN availability list is broadcast continuously and is updated whenever a call (carrier) is started or ended. The actual PN codes are not broadcast for efficiency and security reasons, only the reference designators are broadcast. Note that the Timeslot 0 information is assembled along with the other traffic timeslots and the entire Master TDM frame with its six timeslots is rate ½ FEC encoded.

All remote terminals, when idle, automatically tune to the Master outbound TDM carrier and extract the Timeslot 0 information to obtain the list of available PN codes and TDM channels for placing new outgoing calls to the PSTN, as well as any call announcements for incoming calls from the PSTN to the terminal. Both available channels and call announcement entries consist of four pieces of information: (1) the outbound TDM carrier frequency to be used for the call; (2) the inbound CDMA carrier frequency to be used for the call; (3) the PN code designator; and (4) the call type. The TDM timeslot number used for the call is implied from the reference designator of PN code and does not need to be included in the bulletin board information. The call type indicates whether the defined full-duplex channel is to be used for voice, fax or data as well as the transmission bit rate. Although the TDM timeslot number and PN code designator have a fixed pairing, the inbound and outbound carrier frequencies do not have a fixed relationship so that system flexibility and space segment resource planning efficiency can be maximized. The hub network controller can thus assign inbound and outbound channel based on current availability.

When initiating a call, the remote terminal will randomly select one pair of available inbound frequency/PN code and outbound frequency?TDM timeslot assignments from the bulletin board and transmit a call request message to the hub using that PN code and inbound carrier frequency. The terminal will then await for an acknowledgement that the call request has been accepted by monitoring the associated TDM carrier frequency and timeslot.

If there are no available TDM channels and/or PN codes, the terminal will alert the user that the network is "full" and that the user should try the call at a later time. If the user activates the "callback feature" whereby the terminal controller will continuously monitor the availability of the TDM channels and PN codes on the full network, and then alert the user when a pair becomes available, then the terminal controller will wait for a random time interval after such a pair(s) is available before alerting the user. This prevents two or more terminals who are waiting to make a call from seizing the same first available frequency/code pair when the network is full.

At the terminal, the actual transmit and receive frequencies are determined by summing a base channel frequency with a frequency offset. The base channel frequency is stored in non-volatile RAM in the remote terminal (a separate base channel frequency is stored for each hub with which the terminal is registered). The frequency offset is provided in the bulletin board channel availability messages. Periodically, a bulletin board field will indicate the base channel frequency of the transmitting hub. If the terminal ever finds a disparity between its base channel frequency and the hub's, it will refresh its base channel frequency stored in non-volatile RAM.

At the hub, each channel unit has its despreaders continually operating with the N known PN sequences. Each channel unit is tuned to one of the available inbound center frequencies. One of the channel units, corresponding to the inbound center frequency selected by the terminal, will obtain PN synchronization on the despreader associated with the PN code selected by the terminal. The Satellite Link Modem will indicate the presence of the PN synchronization and carrier synchronization to the CU Controller. Received signaling frames from the terminal will be sent to the CU Controller for action.

The CU controller will alert the Hub Processor, which will remove the selected PN code for the selected inbound center frequency form the "codes available" list, validate the access request, and prepare an acknowledgment via the associated TDM channel (through the CU Controller) for that CU.

Once an acknowledgment is received, the terminal will begin the full-duplex communication. Having the entire call set-up procedure handled "inband" allows for a smoother transition from the set-up procedure to the active call without frequency retuning since the terminal is already in possession of the PN code/frequency pair.

If the acknowledgment is not received prior to the expiration of a timeout, the terminal will retune to the Master TDM carrier bulletin board, extract either the same TDM channel/PN code pair (if still listed as available) or another available pair at random and begin the access request process again. After a predetermined number of unsuccessful attempts, the terminal will alert the user and indicate that the network is unavailable and that the user should try the call again later.

The use of CDMA presents an inherent advantage in mitigating collisions if two remote terminals simultaneously attempt to set up a call using the same carrier frequency and PN code. The autocorrelation function for the PN code is very small for all non-zero time offsets greater in magnitude than the duration of one PN chip period. Thus two terminals do not significantly interfere with each other unless their PN codes are aligned in time. This is not very likely since both terminals place a call setup request randomly in time. The hub will therefore most likely acquire one of the terminals successfully and the other terminal will not be acknowledged by the hub and will time out and abort the call setup request.

For calls from the PSTN to a remote terminal, a call announcement appears on Timeslot 0 of the Master TDM carrier. Upon recognizing that a call is to be initiated to the hub, the terminal progresses through the same steps as above. While the remote call announcement and response process is under way, a recorded message at the hub asks the PSTN caller to wait while the terminal is being contacted to place through the call. Since the terminal is retuned to a different TDM channel/PN code pair (compared to the Master TDM carrier), an "in-band" signalling field is necessitated for each traffic timeslot for any call signaling for call set-up or while a call is in progress.

For mesh mode operation between two remote terminals the call setup procedure is similar except that the hub is not used to establish a connection to the PSTN. In fact, a single hub can readily handle calls for both star and mesh connectivity. The hub broadcasts a separate list of available star connectivity channels/PN codes and mesh connectivity channels/PN codes on a single bulletin board contained in the master TDM carrier. To place a mesh call to another remote terminal, the calling terminal selects a mesh connectivity frequency channel and PN code combination from the bulletin board and makes a mesh call request to the hub. Upon receipt of the call request, the hub acknowledges the request and removes that channel/PN code from the bulletin board list. Thus hub also removes a second frequency channel and PN code combination from the bulletin board list. The hub also removes a second frequency channel and PN code combination from the bulletin board which is now reserved for the called mesh-mode terminal. The hub then issues a call request to the terminal that is desired to be called through the master TDM carrier. The call request must contain an identifier indicating that it is a mesh call.

Upon receipt of the call request from the hub, the called terminal acknowledges on its assigned carrier frequency and PN code. At that point, the hub is not longer active in the call. The calling terminal transmits on its assigned frequency and PN code and receives on the other terminal's frequency and PN code. Conversely, the called terminal transmits on its assigned frequency and PN code and receives on the other terminal's frequency and PN code. The hub continues to monitor both terminals for billing purposes. Thus when on party terminates the call, the hub can record the call duration and place both channels back into the list of available channels.

Accordingly, a terminal is readily acceptable of receiving both star and mesh-mode calls. When a terminal is not involved in a call, it continuously monitors the hub master TDM carrier. When a call request is made from the hub with terminal's identification number, the terminal will first check to see if the call request type is star or mesh. The terminal will then act accordingly.

The same CDMA transmission format is used for both star and mesh modes so that no addition transmission hardware is needed in the terminal. However, the terminal does require both TDM and CDMA receiving hardware/software in order to utilize mesh mode. This is readily accomplished with current programmable digital signal processing (DSP) devices. It should also be noted that a larger antenna (e.g., 1.0 m at $K_u$-band) may be required to establish a reliable link in mesh mode. However, the frequency planning of a mixed star and mesh mode system is quite efficient since the CDMA bandwidth is the same for both.

Each CDMA terminal offers voice, data and fax ports. High quality compressed voice at 4800 bit/s with ½ FEC is used for efficient system utilization, with a quality that is comparable to the North American 8 kbit/s digital cellular standard. Multirate data services, ranging from 1.2 kbit/s to 64 kbit/s are feasible. Quasi-realtime fax transmission at rates up to 14.4 kbit/s can also be accommodated. The higher data rates for data and fax services can be requested on-demand during call setup. For INTELSAT satellites with global beams, the default bit rate for data an fax services is 2400 bit/s with ¼ FEC to lower the bit error rate to below $10^{-6}$. Data rates higher than 2400 bit/s utilize subsets of the same PN codes but the spread factor is reduced. Thus, the bandwidth remains constant for all rates. For outbound transmissions the TDM format always remains the same but multiple timeslots within a frame may be assigned to a single user.

Referring to FIG. 5, a functional block diagram of the hub, The hub earth station equipment can be interfaced to existing earth station facilities at a standard IF frequency (typically 70 or 140 MHz) through IF converters and summers. Major elements of the equipment include channel units 100 (each comprising a link modem and voice codec-VFDU), the network management system (NMS) 110, and the telephone switch 120.

Each channel unit (CU) card performs TDM transmit and time-shared multi-carrier CDMA receive functions. A CU is designed to accommodate up to six simultaneous CDMA channels. Thus, for every increment of 1 MHz, the service provider will add one or more channel unit cards (if the are 6 users/MHz) or four more cards (if there are 24 users/MHz).

An innovative CU digital design and LAN connectivity coupled with Internet Protocol (IP) addressing allows a fully digital voice path with direct E1/T1 outputs, echo cancellation performed on the channel unit without the need for external devices, and a direct interface to the Internet, if desired.

For configurations up to 90 channels, the entire NMS/Hub is confined to a single standard 19 inch rack. The rack comprises general purpose computers, a fully digital telephone switch, and universal chassis for housing the channel units, the frequency generation unit, the channel bank and other specialty modules are hot-swappable so that units can be removed and inserted without any service interruption.

The telephone switch provides full inter-connectivity between the PSTN and the satellite networks. Multiple telephone interfaces and protocols are supported including E1, T1, DTMF signalling to R2D signalling. The telephone switch also provides recorded voice announcements, tone generation and detection. The associated channel bank extends the telephone interfaces to 2-wire (for the local telephone operator) and 4-wire E&M for direct PBX interfaces. Additionally, the hub station is not limited to interfacing a PSTN but may also interface to private switched telephone networks as well as wire or wireless networks.

The frequency generation unit provides a highly stable low phase noise frequency reference to the entire satellite network. The unit is locked on the GPS time to eliminate the need for frequency calibration.

Figure 6:
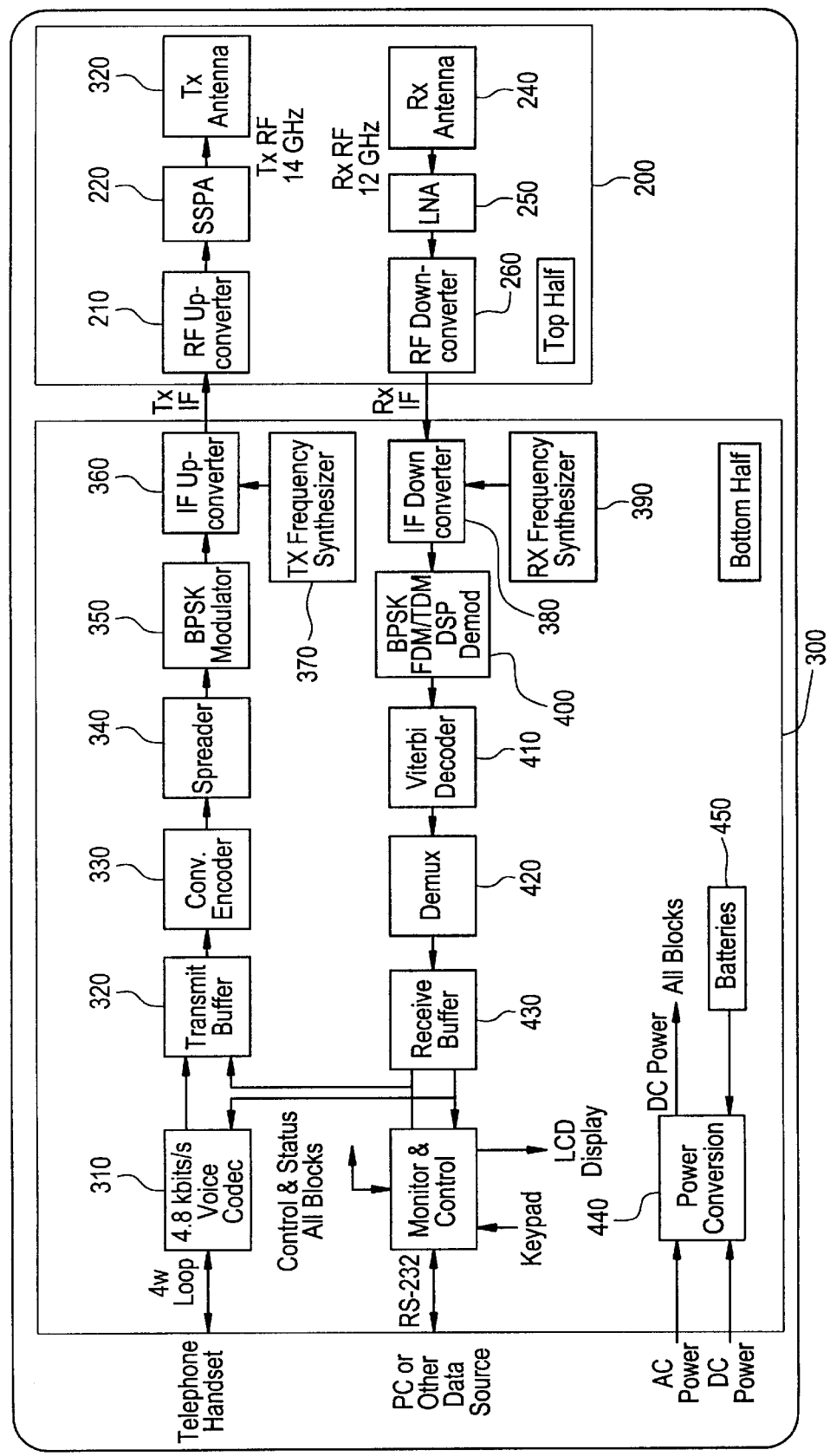
FIG. 6 shows a block diagram of the briefcase remote terminal.

As shown in FIG. 6, a block diagram of the remote terminal, the top half 200 of the briefcase unit contains all the RF electronics, and includes interfaces at a lower intermediate frequency (IF). The top half transmit hardware consists of the IF to RF upconverter 210, solid-state power amplifier (SSPA) 220 and transmit antenna 230. The top half receive hardware consists of a receive antenna 240, a low noise amplifier (LNA) 250 and an RF to IF downconverter 260.

The transmit and receive IF cables are connected to the bottom half of the briefcase 300, which contains the remaining circuitry. A monitor and control microprocessor provides the interface to the user keypad and LCD display which are used, among other things, to enter telephone numbers for placing calls. The microprocessor also provides initialization and real-time control to all the other function blocks in the unit.

The unit is designed to operate from either AC or DC power using internal power conversion circuitry 440. Optionally, the unit may be powered form internal batteries 450.

A standard 4-wire telephone handset containing a microphone and a speaker is used for the voice interface. The handset is connected to a 4.8 kbit/s voice codec which provides A/D conversion and digital speech compression on the transmit side, and digital speech decompression and D/A conversion on the receive side.

The transmit side of the voice codec 310 is interfaced to a digital transmit buffer 320. The data in the transmit buffer is encode by a convolutional encoder 330, spread by the selected PN code in the spreader 340, and then BPSK modulated by a BPSK modulator 350. The resulting modulated baseband signal is then upconverted to IF in the IF upconverter 360 to the desired channel frequency determined by the TX frequency synthesizer 370.

The receive IF from the top half of the briefcase is downconverted form IF to baseband by the IF downconverter 380. The channel tuning function is accomplished by the Rx frequency synthesizer 390. The baseband signal is demodulated by the BPSK FDM/TDM DSP demod 400. This block also performs CDMA despreading by the desired PN code for mesh mode operation. The demodulated bit stream is convolutionally decoded by the Viterbi decoder 410 and the decoded TDM bit stream id demultiplexed by the demux 420. Finally, the demultiplexer output is buffered in the receive buffer 430 and passed to the voice codec 310 for conversion back to a speech waveform.

Figure 7A:
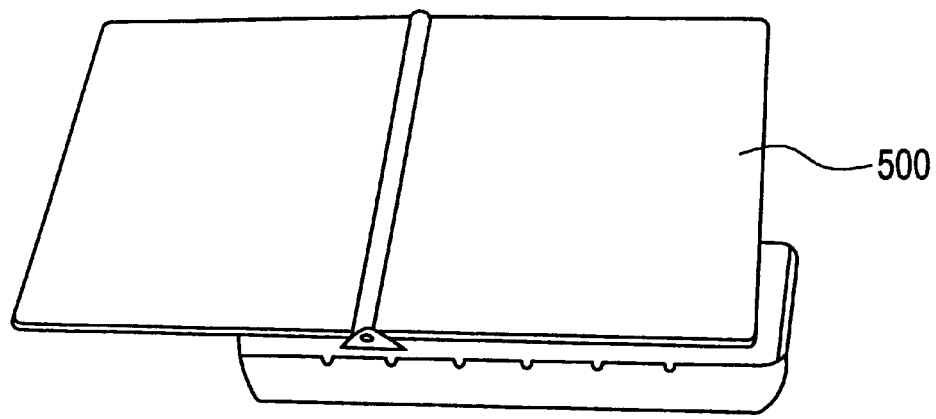
FIGS. 7A and 7B show the components of the briefcase remote terminal.
Figure 7B:
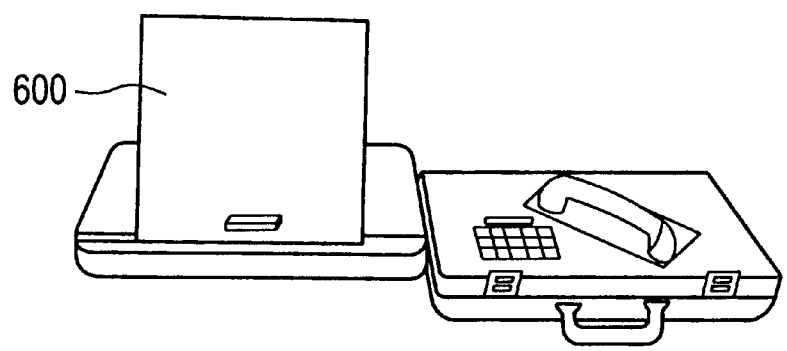

FIGS. 7A and 7B are illustrations of the briefcase remote terminal. The top half or upper part of the briefcase terminal includes a full duplex Tx/Rx $K_u$-band flat plate antenna as described in U.S. Pat. Nos. 4,761,654; 4,926,189; 4,929,959; and 4,943,809; and incorporated herein by reference. The antenna may be either a foldable hinged two-panel flat plate 500 wherein each panel is approximately 0.3 m square or a tandem one-panel flat plate 600 antenna, approximately 0.32 meters square, with the transmit and receive panels stacked on top of each other. No feedhorn or external feed assembly is required. Since the antenna is implemented as a printed copper circuit, the feed network is inherent in the printed track routing. Accordingly, the antenna profile is very thin and flat.

Figure 8:
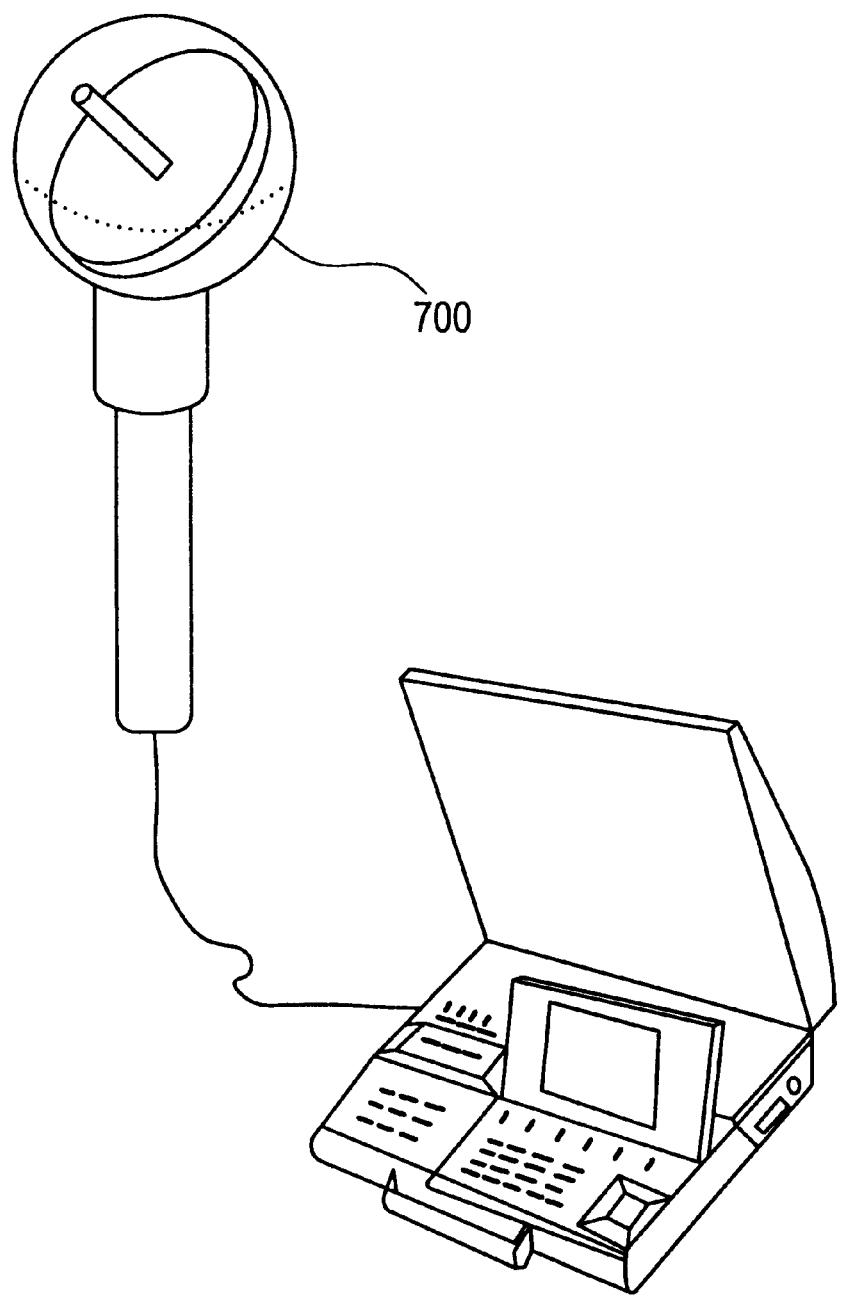
FIG. 8 shows the components of the C-band remote terminal.

FIG. 8 depicts another embodiment of the present invention wherein a C-band maritime or railroad mobile terminal is provided. While the system architecture and briefcase terminal are functionally the same as $K_u$-band embodiment, a 0.8 to 1.2 meter C-band dish antenna 700 is utilized at the terminal for transmitting and receiving voice, data and fax.

Although certain preferred embodiments of the present invention have been described, the spirit and scope of the invention is by no means restricted to what is described above. For example, the system architecture is independent of the frequency band and is not limited to the use of C- and $K_u$-band. For example, the invention is compatible with future $K_a$-band satellites.

What is claimed is:

1. A satellite communications system comprising:
   a hub station including
      means for providing an outbound communications link for transmitting time division multiplexed signals from said hub to a plurality of remote terminals,
      means for implementing a frequency plan having fixed bandwidth steps, each of said bandwidth steps being partitioned into inbound and outbound carrier frequency subbands and having a fixed set of different PN codes which are re-used for each bandwidth step,
      means for broadcasting a list of available PN codes, available inbound carrier frequency subbands, and available outbound carrier frequency subbands, and
      means for receiving inbound code division multiple access (CDMA) signals using said PN codes; and
   a plurality of remote terminals each including
      means for providing an inbound communication link for transmitting CDMA signals from each of said remote terminals to said hub station, and
      means for randomly selecting an available inbound carrier frequency—PN code pair within a bandwidth step from said broadcasted list,
      means for receiving outbound time division multiplexed signals; and
   a satellite, said satellite providing a relay for communications between said hub station and said remote terminals.

2. The satellite communications system of claim 1 wherein said remote terminals are portable.

3. The satellite communications system of claim 1 wherein said hub station and said plurality of remote stations communicate via $K_u$-band.

4. The satellite communications system of claim 1 wherein said remote terminals include antenna means having a flat plate antenna of dimension not greater than 1 meter by 1 meters.

5. The satellite communications system of claim 1 wherein hub station and said plurality of remote stations communicate via C-band.

6. The satellite communications system of claim 1 wherein said remote terminals include antenna means having a parabolic dish not greater than 1.2 meters in diameter.

7. The satellite communications system of claim 1 wherein
   said hub station and said remote terminals include means for transmitting and receiving call setup and takedown signalling on a same carrier that is used for traffic.

8. The satellite communication system of claim 1 wherein each of said remote terminals tuned to the same fixed bandwidth step use different PN codes when transmitting simultaneously.

9. The satellite communications system of claim 1 wherein said fixed set of PN codes contains between 6 and 24 different PN codes.

10. The satellite communications system of claim 1 wherein
said frequency plan can utilize non-contiguous bandwidth on one or more satellite transponders.

11. The satellite communications system of claim 1 wherein said outbound and inbound carrier frequency subbands do not have to be paired or dedicated.

12. The satellite communications system of claim 1 wherein said hub station and said remote terminals may be interchangeably operated in a star configuration or a mesh configuration without changes in signalling and occupied transponder bandwidth.

13. The satellite communications system of claim 1 wherein said hub station interfaces to a switched telephone network.

14. The satellite communications system of claim 1 wherein said remote terminals communicate with each other in a single-hop mesh configuration and each include means for receiving CDMA signals from other remote terminals.

15. The satellite communications system of claim 1 wherein said hub station and said remote terminals may utilize multiple data rates without changes in occupied transponder bandwidth.

16. The satellite communications system of claim 1 wherein said hub station and said remote terminals communicate in full-duplex.

17. A method of satellite communication between a hub station and a remote terminal comprising:
creating a frequency plan having fixed bandwidth steps, each of said bandwidth steps being divided into inbound and outbound carrier frequency subbands, and having a fixed set of different PN codes which are re-used for each bandwidth step;
broadcasting from said hub to said remote terminal a list of available PN codes corresponding to each available inbound carrier frequency subband within a particular bandwidth step which are not currently being used by any remote terminals;
randomly selecting at said remote terminal an available inbound carrier frequency and PN code pair within a bandwidth step from transmitted said list to setup a communication link between said hub station and said remote terminal;
removing at said hub station said selected inbound carrier frequency—PN code pair from said broadcasted list of available PN codes and carrier frequencies,
transmitting inbound narrowband CDMA signals from said portable remote terminal to said hub station using said selected inbound carrier frequency—PN code pair;
and transmitting outbound TDM signals from said hub station to said remote terminal using a selected outbound carrier frequency.

18. A satellite communications system with full-duplex simultaneous transmission and reception comprising:
a hub station including means for providing an outbound communications link for transmitting time division multiplexed signals from said hub to a plurality of remote terminals and means for creating a frequency plan based on fixed bandwidth steps each of said bandwidth steps being partitioned into inbound and outbound carrier frequency subbands and having a fixed set of PN codes which are the same for each bandwidth step; and
a plurality of remote terminals each including means providing inbound communication link for transmitting CDMA signals from said remote terminals to said hub station or to other remote terminals, said hub station and said remote terminals having a network topology which may be interchangeably operated in both a star configuration and a mesh configuration without changes in signalling and occupied transponder bandwidth.

19. A satellite communication system with full-duplex simultaneous transmission and reception comprising:
a hub station including means for providing an outbound communications link for transmitting time division multiplexed signals from said hub to a plurality of remote terminals and means for transmitting a list of available PN codes corresponding to each available inbound carrier frequency subband within a bandwidth step; and
a plurality of portable remote terminals each including means providing inbound communication link for transmitting CDMA signals from said remote terminals to said hub station or to other remote terminals and means for randomly selecting an available inbound carrier frequency—PN code pair within a bandwidth step from said transmitted list, said hub station and said remote terminals having a network topology which may be interchangeably operated in both a star configuration and a mesh configuration without changes in signaling and occupied transponder bandwidth.

20. The satellite communications system of claim 18 wherein said hub station includes means for receiving inbound code division multiple access (CDMA) signals using said fixed set of PN sequences that do not change from one call to the next.

* * * * *